(12) United States Patent
Breslau et al.

(10) Patent No.: US 7,715,329 B1
(45) Date of Patent: May 11, 2010

(54) METHOD AND SYSTEM FOR COMPILING MULTICAST ROUTER DATA

(75) Inventors: Lee Breslau, Basking Ridge, NJ (US); William Fenner, Woodside, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 659 days.

(21) Appl. No.: 11/300,495

(22) Filed: Dec. 14, 2005

(51) Int. Cl.
*H04L 12/28* (2006.01)
*H04L 12/56* (2006.01)

(52) U.S. Cl. .................. 370/255; 370/390; 370/401

(58) Field of Classification Search ............... 370/252, 370/254, 255, 390, 400, 401
See application file for complete search history.

(56) References Cited

U.S. PATENT DOCUMENTS

| | | | |
|---|---|---|---|
| 6,138,144 A | 10/2000 | DeSimone et al. | |
| 6,181,697 B1 | 1/2001 | Nurenberg et al. | |
| 6,321,270 B1 | 11/2001 | Crawley | |
| 6,331,983 B1 * | 12/2001 | Haggerty et al. | 370/400 |
| 6,430,595 B1 | 8/2002 | Ferguson et al. | |
| 6,490,285 B2 | 12/2002 | Lee et al. | |
| 6,501,763 B1 | 12/2002 | Bhagavath et al. | |
| 6,567,929 B1 | 5/2003 | Bhagavath et al. | |
| 6,600,743 B1 | 7/2003 | Lee et al. | |
| 6,687,230 B1 * | 2/2004 | Furutono et al. | 370/238 |
| 6,724,724 B1 * | 4/2004 | Swenson et al. | 370/231 |
| 6,732,182 B1 | 5/2004 | Beverly | |
| 6,947,392 B2 | 9/2005 | Novaes | |
| 7,197,033 B2 * | 3/2007 | Reeves et al. | 370/389 |
| 2003/0135644 A1 * | 7/2003 | Barrett | 709/238 |
| 2003/0158770 A1 * | 8/2003 | Carlson et al. | 705/9 |
| 2004/0252707 A1 * | 12/2004 | Crocker et al. | 370/402 |
| 2005/0175009 A1 * | 8/2005 | Bauer | 370/390 |
| 2006/0007865 A1 * | 1/2006 | White et al. | 370/238 |
| 2006/0098607 A1 * | 5/2006 | Zeng et al. | 370/338 |
| 2006/0209826 A1 * | 9/2006 | Kawamura | 370/390 |
| 2007/0019646 A1 * | 1/2007 | Bryant et al. | 370/390 |

\* cited by examiner

*Primary Examiner*—Hong Cho
(74) *Attorney, Agent, or Firm*—Hoffmann & Baron, LLP

(57) ABSTRACT

A method of obtaining router information in a multicast network, including transmitting a routing table query and a router name query, receiving router state data associated with a multicast router in response to the routing table query, and receiving a router identifier associated with the multicast router in response to the router name query, the router identifier being distinct from any IP address associated with the multicast router. Also disclosed is a system using a processing device adapted to perform the above method and transmit the router state data to a graphical user interface. The queries are preferably transmitted in Simple Network Management Protocol (SNMP). Further, a part of the displayed data can include hypertext links on router names adapted to display router state data associated with a second multicast router.

13 Claims, 9 Drawing Sheets

FIG. 2

```
        Initial Router CMTR11 (10.0.1.54)
        Source:        0.0.0.0
        Group:         239.1.1.3
        Application:   mvideo --CMTR11   (10.0.1.54) *RP*  ―― 10
 +-CMTR10   (10.0.7.73)
 | +-SCHTR10   (10.0.7.65)
 | | +-SNYTR10   (10.0.7.186)
 | | | +-SNYTR11   (10.0.7.181)
 | | |   +-G6BR1   (10.0.7.154)  ― 60
 | | |
 | | +-SCHTR11   (10.0.7.189)
 | |   +-ipfrga90p10-z150   (172.26.15.21)   ― 61
 | |   | +-ipfrca91m11-z052  (172.26.15.158) ―
 | |   | +-ipfrca91m12-z053  (172.26.15.166) ― 60
 | |   |
 | |   +-NYTR10   (10.0.7.21)
 | |     +-NYHT7   (10.0.1.13)
 | |       +-NYTR11   (10.0.1.10)
 | |         +-ipfrtx90p09-z040  (172.26.16.5)  ― 63
 | |         +-ipfrtx90p10-z180  (172.26.16.25) ― 64
 | |
 +- ACTR11   (10.0.7.209)
    +-ACTR10   (10.0.7.2)
      +-SFTR11   (10.0.7.46)
        +-CHTR11   (10.0.7.9)
          +-PrGSR-7.iplabs.att.com  (10.144.5.6)  ― 50
```

*FIG. 3*

Initial Router CMTR11 (10.144.5.6)
Source:      10.144.10.7
Group:       239.1.1.3
Application: mvideo PrGSR-7.iplabs.att.com (10.144.5.6) — 50
+-CHTR11   (10.144.5.5)
  +-CHTR10   (10.144.5.2)
    +-SFTR10   (10.0.7.57)
      +-SFTR11   (10.0.7.202)
        +-ACTR10   (10.0.7.45)
          +-ACTR11   (10.0.7.1)
            +-CMTR10   (10.0.7.210)
              +-CMTR11   (10.0.7.65) *RP* — 10

FIG. 4(Continued)

191 {
Application: mvideo
(172.26.8.50, 239.1.1.3), uptime 2d22h, expires 00:03:18, flags:ST
Incoming interface: POS/10/1/1, RPF neighbor G6BR1 (172.26.15.26)
Outgoing interface: list:
   ipfrca91m11-z052
      (atmSubInterface/10/1.3724) Forward/Sparse, 2d22h/00:03:14
   SCHTR11 (POS/10/1/0), Forward/Sparse, 2d22h/00:03:18
[Display Tree]
}

192 {
Application: mvideo
(172.26.8.52, 239.1.1.3), uptime 2d22h, expires 00:03:28, flags:ST
Incoming interface:
atmSubIterface/10/1.3724, RPF neighbor ipfrca91m11-z052 (172.26.15.158)
Outgoing interface: list:
   ipfrca91m12-z053      178
      (atmSubInterface/10/1.3725) Forward/Sparse, 2d22h/00:02:56
   SCHTR11 (POS/10/1/0), Forward/Sparse, 2d22h/00:03:18
[Display Tree]  178
}

193 {
Application: mvideo
(172.26.8.53, 239.1.1.3), uptime 2d22h, expires 00:03:18, flags:ST
Incoming interface:
atmSubIterface/10/1.3725, RPF neighbor ipfrca91m12-z053 (172.26.15.166)
Outgoing interface: list:
   ipfrca91m11-z052
      (atmSubInterface/10/1.3724) Forward/Sparse, 2d22h/00:03:14
   SCHTR11 (POS/10/1/0), Forward/Sparse, 2d22h/00:03:18
[Display Tree]
}

METHOD AND SYSTEM FOR COMPILING MULTICAST ROUTER DATA

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention generally relates to the field of data transmission systems for digital communications and more particularly to the verification, optimization and/or management of multicast data transmissions over a network.

2. Brief Description of the Related Art

Internet Protocol (IP) multicasting provides a useful way for a source to transmit a stream of data to a group of recipients. Traditional network computing applications transmit data employing a unicast design. Unicast communications send one copy of each data packet to each intended recipient. However, unicast presents scaling problems, when the group of recipients is large. In unicast, the network must carry multiple copies of the same data, thus requiring additional bandwidth for data transmission. In contrast, IP multicasting (also referred to simply as "multicasting") transmits only one copy of the data packets and allows multicast enabled routers to do the work required to deliver that packet to each intended recipient. Further information on multicasting is provided in U.S. Pat. No. 6,501,763, which is incorporated herein by reference.

Multicast uses the concept of a group to route its data. A group of receivers subscribe to a particular multicast transmission. The individual receivers of the group need not physically or geographically be located near one another. Similarly, the data can be transmitted to the group from one or more sources located virtually anywhere, as long as they can communicate with the receivers, through a common network of computers, such as the Internet. Rather than transmitting multiple copies of data packets to each receiver, as in unicast, multicast transmits one copy of its data packets to a group address. Multicast group addresses are reserved IP addresses in the range of 224.0.0.0-239.255.255.255.

The Internet comprises among other things, a network of routers that pass-along and route data. This network of routers is commonly referred to as the Internet backbone. Within the Internet backbone is a subset of multicast-enabled routers, that are programmed to handle IP multicast routing. Multicast-enabled routers are unique in that they can handle both multicasting and unicasting protocols. Multicasting is governed by its own distinct protocols. Groups of multicast-enabled routers can be connected to each other by virtual point-to-point links called tunnels. The tunnels provide passage for multicast traffic through one or more non-multicast-enabled routers, encapsulating the packets so that they appear to be normal unicast packets to the intervening router(s). The encapsulation is added at the beginning of the tunnel and removed at the end of that tunnel. In this way, a group of multicast-enabled routers can be connected to other multicast-enabled routers.

Data loss in multicasting has various sources, such as congestion in the network and Internet Service Providers (ISPs) improperly conveying multicast packets, but potentially a more significant impact then in unicasting. The distribution of routers in a multicasting session generally has a tree-like configuration with numerous branches. This is generally referred to as the multicast distribution tree. In this configuration, due to the nature of multicast when packets are lost in transit, all recipients on downstream branches from that point lose the same packet(s).

Each source in a multicast group transmits data which is associated with that source's IP address and the designated multicast group's IP address. This address pair is generally represented by the notation (S,G), where S is a source IP address and G is the group IP address. This address pair (S,G) also represents the distribution tree of routers (referred to as a "source distribution tree") from the specified source to all last hop routers (receivers) in the group. No two sources transmitting to the same multicast group should have the same (S,G) IP address pairing.

Another aspect of multicasting is that in order to maximize efficiencies, multicast-enabled routers will often designate a Rendezvous Point (RP) router within the network for a particular group. The RP routers are multicast enabled routers that form a focal point for receipt and redistribution of the data packets that are the multicast transmission for a particular multicast group. Because the data packets from all sources in the multicast group are re-transmitted from the RP, the notation (*,G) is used to represent the shared multicast distribution tree from this point (referred to as a "shared distribution tree"). The wildcard notation "*" refers to all sources for the group (G).

Members of a multicast group can join or leave at any time, so the distribution trees in multicast can be dynamic. When all the receivers on a particular branch stop requesting receipt of the multicast transmission, the multicast-enabled routers prune that branch and potentially reconfigure the distribution tree. Similarly, when new receivers request to join a group, branch additions and reconfiguration may be necessary.

An example of a simple network of multicast-enabled routers is shown in FIG. 1. The routers are each labeled with their respective router names. In this example, multicast traffic from a single source router 50 travels to RP router 10, with the path taken by the transmitted data packets indicated by dashed lines. The configuration of routers followed by the dashed lines represents a source distribution tree for this multicast group. In fact, since the source router 50 is the only source for this group, the dashed lines represent the only source distribution tree for this group. If additional sources were to join the group, the data packets from that source would be sent to the RP router 10. Once received by the RP router 10 the data packets are then redistributed to all receivers along the shared distribution tree, which is represented by the solid connector lines. In this simple network there are six active receiver routers 50, 60, 61, 62, 63, 64. The number of routers that make up a multicast network can be greater or smaller than that shown in this example. Similarly, the number of sources or receivers can vary dramatically. Further, the number of sources is independent from the number of receivers. Although, often in multicast the source routers also act as receivers in the same multicast group, as is the case in this sample multicast network shown in FIG. 1. Additionally, it should be noted that the router path from a source router 50 to RP router 10, is not necessarily reversed in order to redistribute data packets to a source router acting as a receiver router 50. This is demonstrated in FIG. 1 by the fact that the dashed lines do not follow the same exact path as the solid lines. Also, although the illustration in FIG. 1 is helpful in visualizing a multicast network, no real-time tool currently exists that provides such visualization, even in distribution tree layout, of an active multicast network.

One particular problem in multicasting is the verification of whether data has been received by all intended recipients. It is difficult to determine which routers along the transmission path received and forwarded their data as intended. As such, network administrators must wait to hear about problems from hosts or intended recipient users that report them. In other words, rather than performing proactive trouble prevention, network administrators generally troubleshoot after a problem has impacted the customer. This occurs mainly because network administrators lack effective tools for monitoring, managing and preventing data loss.

Currently, network administrators/operators manage (i.e., debug or troubleshoot) multicast routing problems by reviewing multicast routing table entries. Multicast routers maintain state information about the incoming and outgoing interfaces for each (S,G) pair, as well as the shared distribution tree (*,G). For a router, state information is used by the router to decide which packets to discard or which packets to forward and how to forward them. Generally, after hearing about a problem impacting a multicast group, operators investigate by accessing individual routers active for that group. This is a cumbersome and time consuming process that requires the administrator to login to an individual router, analyze routing table data stored in that router and then repeat this process with additional routers, if necessary. The selected router may not turn out to be the source of the problem, which will require the administrator to login to additional routers until the problem is identified. This type of troubleshooting is generally performed using a command line interface (CLI) at a user computer terminal with Internet access.

By entering specific commands, the administrator is able to login to an individual router and view network management data stored therein, such as its routing table. Using CLI, the administrator, after logging-into a specific router, can enter numerous commands, such as the "show ip mroute" command. This particular command displays the full content of the IP multicast routing table. This is useful to network administrators as it shows a great deal of information about a single router, by running a single command. However, the output from this command can potentially include thousands of routing table entries, which becomes unmanageable as a quick reference tool. In addition, the output is only a display and does not provide links to further information on related routers, such as RP, data source or neighboring routers. In order for an administrator to conduct follow-up monitoring or investigation of related routers, he or she must take note of the IP addresses of the desired router(s) and then individually login to those one at a time.

Having to manually login to each router makes it very difficult for administrators to quickly identify problems or analyze conditions across a multicast group network in real-time. In fact, the conventional method makes comparison or analysis of more than just a few network resources difficult or at least impractical in a real-time network environment. Also, it makes it difficult to envision or get an overall picture of the current active network topology in a multicast group, which would otherwise assist in monitoring that group.

The Simple Network Management Protocol (SNMP) is a well-known application layer protocol that is used to access and/or exchange management information between network devices. Network administrators use this protocol to view or access information needed to manage a network. However, SNMP is not used by network operators to view multicast router information because, in contrast to the CLI method, it does not provide a quick and simple method of compiling the extensive routing table data maintained for a router. A more detailed background on SNMP is provided in Rose, Marshall T., "The Simple Book: An Introduction to Networking Management", Prentice Hall, $2^{nd}$ Ed., 1996, which is incorporated herein by reference.

SUMMARY OF THE INVENTION

A network administrator can quickly and easily monitor multicast-related routing conditions at a plurality of network routers with the present invention. Disclosed is a method of generating a display representing the router state of at least one router in a multicast network, using a computer driven system. The method comprises receiving data input representing a multicast router identifier, transmitting table query data signals representing a routing table query for obtaining router state information of the identified multicast router, receiving router table data signals, in response to the table query data signals, representing router state data for the identified multicast router, wherein the router state data identifies at least one other multicast router, compiling a router name for each of the at least one other multicast router, generating a user interface display of comprising the at least one other router name and at least portions of the router state data.

Briefly described, one embodiment of the present invention comprises a method of providing router information in a multicast network, including transmitting a routing table query and a router name query receiving router state data associated with a multicast router in response to the routing table query, and receiving a router identifier associated with the multicast router in response to the router name query, the router identifier being distinct from any IP address associated with the multicast router.

Additionally, the selective routing table query is preferably adapted to be transmitted in Simple Network Management Protocol (SNMP). Also, the method can further comprise transmitting a router name query, receiving a router identifier associated with the first multicast router in response to the router name query; and displaying the router identifier. The router identifier can be at least part of a router name. Also, the selective routing table query can further comprise at least a multicast group identifier. Further, the portion of router state data can comprise an identifier for at least one second multicast router. Further still, a part of the displayed portion of router state data can comprise a user interface hypertext link adapted to display a portion of router state data associated with a second multicast router.

The present invention can further comprise a method of providing router information in a multicast network, including transmitting a selective routing table query comprising at least a source identifier, transmitting a router name query, receiving router state data associated with a multicast router in response to the selective routing table query, receiving a router identifier associated with the multicast router in response to the selective router name query, and displaying the router state data and the router identifier. That routing table query can be adapted to be transmitted in Simple Network Management Protocol (SNMP). Also, that routing table query can comprise at least a source identifier.

The present invention can further comprise a system adapted to obtain multicast router information in a multicast network including a processing device adapted to transmit a routing table query and a router name query, receive router state data associated with the multicast router in response to the routing table query, and receive a routing identifier associated with the multicast router in response to the router name query, the router identifier being distinct from any IP address associated with the multicast router.

The selective routing table query of that system can be adapted to be transmitted in Simple Network Management Protocol (SNMP). Also, the processing device can be adapted to transmit a router name query, receive a router identifier associated with the multicast router in response to the router name query; and transmit the router identifier to the user interface display. Further, the router identifier can be at least part of a router name. Further still, the selective routing table query can comprise at least a multicast group identifier. Additionally, the portion of router state data can further comprise an identifier for at least one second multicast router. Even further still, a displayed portion of the router state data can comprise a user interface hypertext link adapted to display a portion of router state data associated with a second multicast router.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 2 shows a graphical representation of the shared distribution tree for the multicast network shown in FIG. 1.

FIG. 3 shows a graphical representation of a source distribution tree for the multicast network shown in FIG. 1.

DETAILED DESCRIPTION OF THE PREFERRED EMBODIMENTS

An element of the present invention uses a customized computer software application that can be used as a network administrator tool, in accordance with the present invention. Using a programmable computer with a user interface that can access the Internet or any enterprise network, the multicast network administrator will initiate the Router State Query software application of the present invention. The Router State Query software application was compiled using Perl, the cross platform programming language, for its rapid prototyping and portability, but other known languages could be used to obtain similar results. Additionally, a web interface, such as Ubiquity®, is preferably used and a data storage and management system is preferably used, such as MySQL®. Further, SNMP is used in the preferred embodiment for its deployablility and interoperability in current telecommunications networks. It is known, however, that other programming languages, web or network interfaces, data storage/management systems and protocols could be used to emulate the results described below. However, it should be noted that while these and similar approaches can be used to execute the instant invention, they do not teach, by themselves or collectively, the method and system described herein.

For illustrative purposes, the multicast network displayed in FIG. 1 will be used as a reference for the application of the instant invention, discussed more fully below. However, the present invention is intended to function with virtually any multicast network configuration. FIG. 2 illustrates the hierarchical tree-like structure of the data distribution path starting at a Rendezvous Point (RP) router identified in FIG. 1 and extending through connecting routers to all intended receivers. This type of configuration is also referred to as a shared distribution tree because all receiver routers share the same RP router that redistributes data from all source transmissions.

Figure 1:
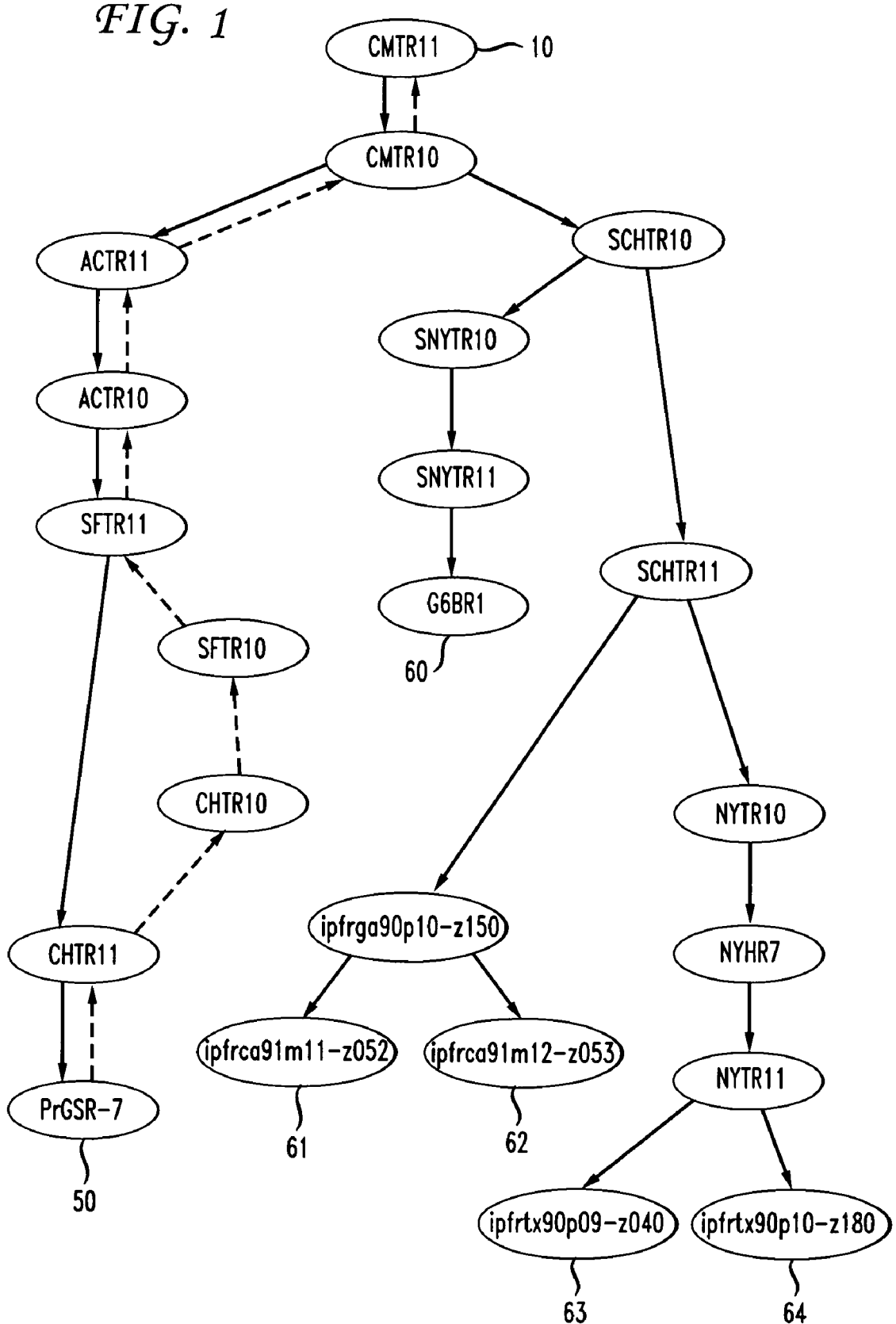
FIG. 1 shows a graphical representation of a basic multicast network.

FIG. 3 illustrates a source distribution tree for the network shown in FIG. 1. The distribution tree shown in FIG. 3 starts at a single source router 50 in the multicast network and extends to the RP router 10. As with the shared distribution tree shown in FIG. 2 and discussed above, the source distribution tree is a graphical representation of the hierarchical tree-like structure of a path taken by multicast data packets. However, unlike the shared distribution tree, the source distribution tree starts at a single data source router 50 and extends to either a RP router 10 or, in a multicast environment that does not use a RP (not shown), to all intended receivers.

Figure 4:
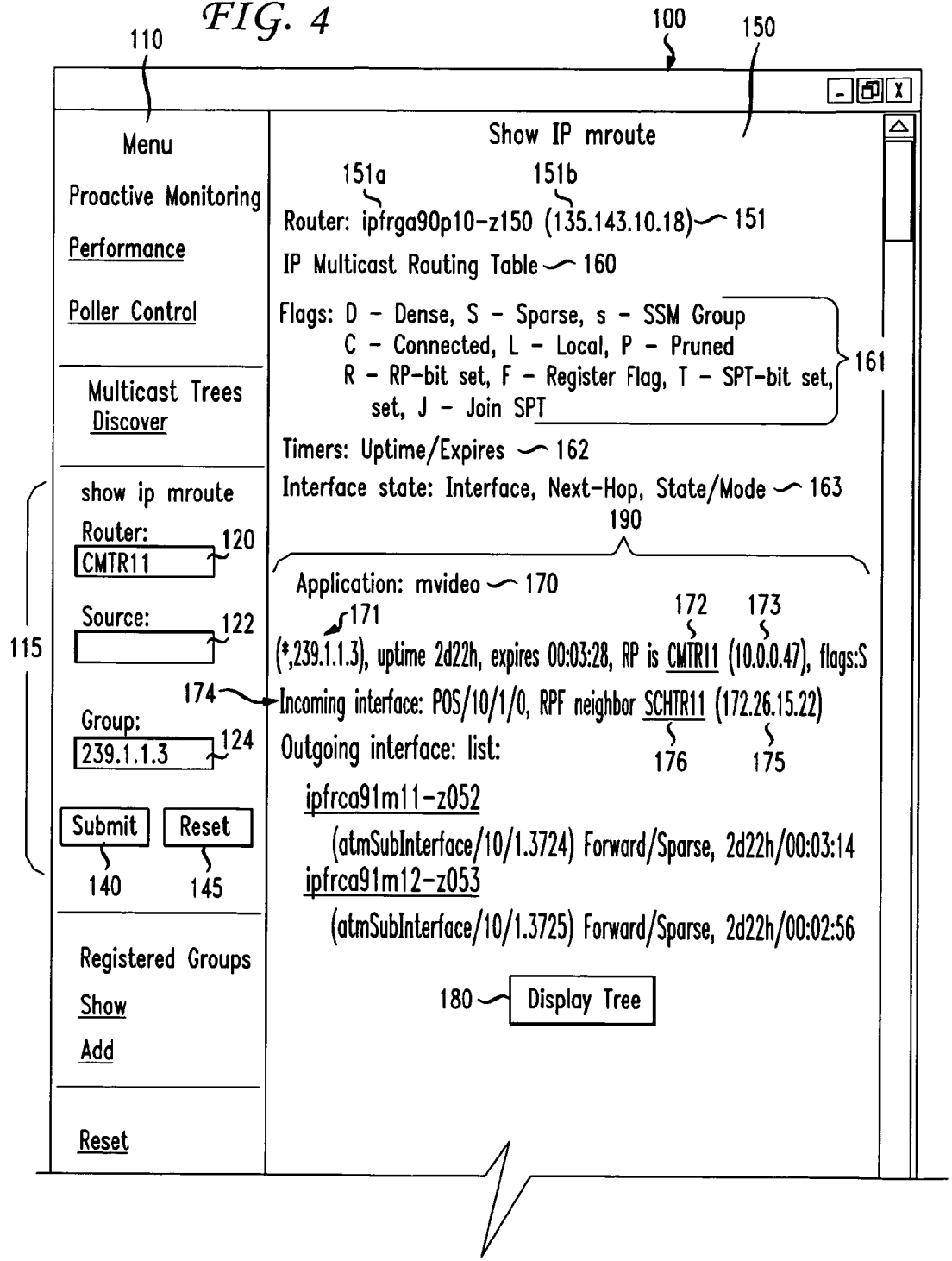
FIG. 4 shows a display at a user interface representing data relating to the router state of a selected router from all data sources in a specified multicast group in accordance with the present invention.

FIG. 4 illustrates an embodiment of the present invention in the form of a display seen at a graphical user interface. The illustration shows a display 100 that is viewed through a traditional Internet web-browser window. The central portion of the display is divided into two primary sections, an input section 110 and an output section 150. Although this embodiment clearly delineates these two sections, in accordance with the present invention, both the input fields and the output data could be compiled and configured together in one section, divided into more sections, or organized to suit the multicast environments being monitored.

The embodiment shown in FIG. 4 was designed to emulate or look and feel like the display seen running the "show ip mroute" command in a CLI setting. However, the current embodiment differs from that which is generated using CLI in various significant ways. Namely, select portions of the traditional routing table output can be displayed based on an identified source, without specifying a group. Also, additional information not normally contained in the routing table is added to the display. The display data is compiled using SNMP, which allows the output to be configured, organized and displayed in a customized format. Thus, although this embodiment follows the display layout traditionally generated by CLI commands, any format can be displayed within the scope of the instant invention, which is another improvement of the present invention.

The input section 110 shown in FIGS. 4, 5, 6, and 7 provides input fields for the user interface. It is understood that many additional input features can be added or incorporated along with ones disclosed herein. However, with regard to the input section 110, the features related to the present invention are located in the area 115 labeled as "show ip mroute." This area heading is a reference to the CLI command used by contemporary administrators and operators discussed in the Background of the Invention. The other input areas and associated text represent additional features that could be incorporated with the present invention, but are not fully discussed here.

A router field 120 allows a user to input a name or code that identifies a particular multicast router. This is the first piece of information used to initiate or submit a query using this underlying software application. In other words, a user preferably starts their monitoring or troubleshooting session at a particular router. In accordance with an embodiment of this invention a router IP address, router name or part of a router's name can be used to identify a router in the router field 120. However, if a router name or partial router name is entered, the system preferably performs an extra function of looking-up that router's IP address based on the information entered.

In one embodiment, the present invention performs the router name conversion by using a predefined lookup table or database. Such a table or database can be stored locally or remotely, as long as it is accessible to the Router State Query application of this invention. Alternatively, the router name conversion can be performed by transmitting router name queries to potential multicast routers and comparing each name or parts thereof to the router name entered in the router field 120. As the IP addresses of the potential multicast routers are already known when transmitting queries to routers, once a match is determined for the router name or partial router name then an IP address is identified. In yet another embodiment a Domain Name System (DNS) query could be used to translate the router names into IP addresses, in a way similar to that of the router name queries.

Once a router identifier has been entered in the router field 120 shown in FIG. 4, a user can select a Submit button 140 to initiate the necessary queries and the results will be displayed in the output section 150. Alternatively, a user can enter additional query criteria in the other input fields discussed below before selecting the Submit button 140. A Reset button 145 is preferably used to clear all fields for editing and initiating subsequent queries.

The other fields in "show ip mroute" area of the input section 110 shown in FIGS. 4, 5, 6 and 7, serve to further filter or alter the query that is run and thus the output generated. For example, a group field 124 can be left blank when submitting a query, causing the output to show the router state information for all multicast groups operating through the identified router. By entering the IP address of a select multicast group the output display is limited to data relating to that group. In an alternate embodiment (not shown), group names or nicknames can also be used as with the router field 120 discussed above. However, multicast group names are not an industry standard, and so such names would be designated by an operator when configuring the software application of the current invention. In other words, group names can be entered in a configuration file that is part of a lookup table used by the program in order to correlate a name entered in the group field with an actual multicast group IP address. Such a table or database could be stored either locally or remotely, as mentioned above.

The source field 122 in FIGS. 4, 5, 6 and 7, allows a user to input an identifier for a data source in the form of an IP address. In fact, the preferred embodiment only allows an IP address to be entered in this field. Although, as discussed in relation to the router field 120 above, the application could be programmed to allow a name or partial name, but then the application would need to translate it into an IP address. However, the translation IP address must match the IP address appearing in the (S,G) routing table. Entering a wildcard indicator, such as "0.0.0.0" or "*" in the source field 122 identifies the shared distribution tree for a multicast group. A source identifier, other than a wildcard indicator, corresponds to a particular source distribution tree. However, as discussed in relation to the group field 124 above, the source field 122 can be left blank. Leaving the source field 122 blank combined with a blank group field 124 will preferably generate the entire list of shared (*,G) and source (S,G) distribution tree entries for the identified router. Entering a source IP address in the source field 122 will modify the output display to show only the identified source distribution tree configuration data for that specified router. In the preferred embodiment, a group identifier is preferably entered in the group field 124 when specifying a source. In other words, the group field preferably contains an entry if the source field is to be specified. Thus, having specified both a source and group the output would only display a source tree entry at the specified router for the identified multicast group.

Figure 6:
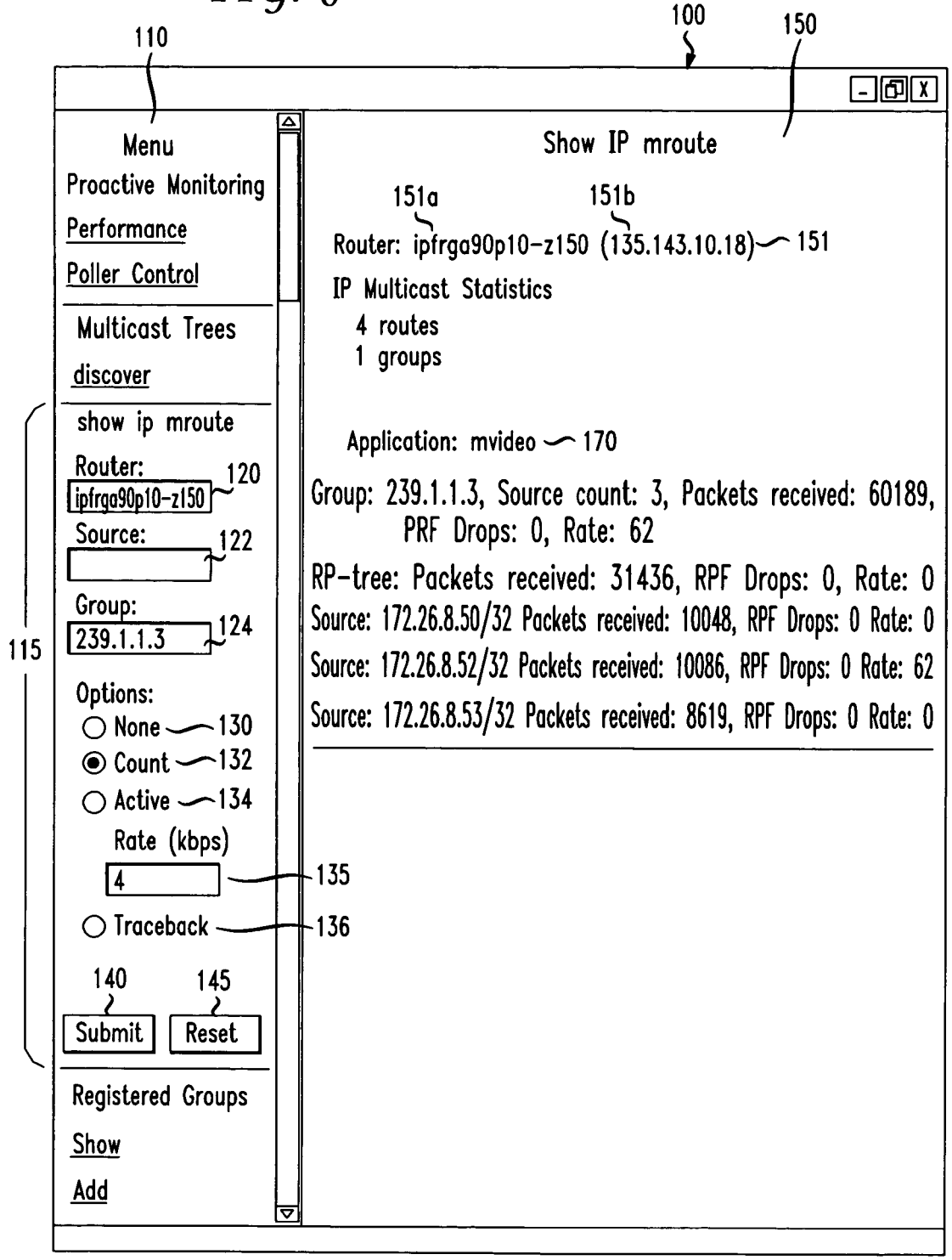
FIG. 6 shows a display at a user interface representing data relating to the router state of a selected router from all data sources in a specified multicast group, wherein a Count option is specified in the input section in accordance with the present invention.
Figure 7:
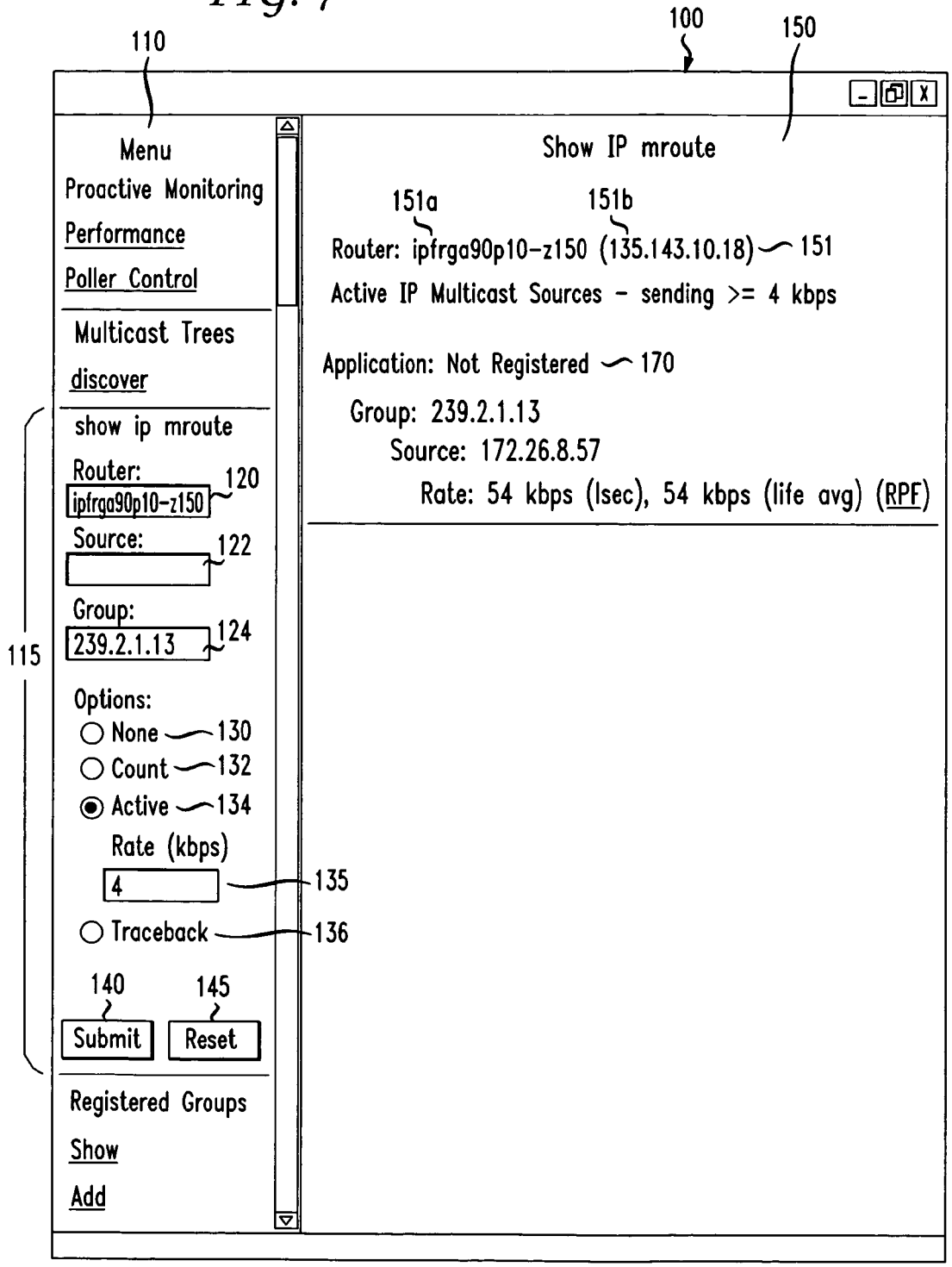
FIG. 7 shows a display at a user interface representing data relating to the router state of a selected router from all data sources in a specified multicast group, wherein an Active option is specified in the input section in accordance with the present invention.

As seen in FIGS. 6 and 7, further options in the input section 110 can be provided and selected by the user for filtering or altering the output display. A none option 130 ads no additional filtering, other than potentially the source distribution tree filtering discussed above. A count option 132 provides information analogous to running the "show ip mroute count" command in the CLI context. With this option, after selecting the Submit button, additional router information is preferably obtained and displayed by the present application that can be used to verify that multicast traffic is received and to check on its flow rates and drops. An active option 134, is analogous to the "show ip mroute active" CLI command, and preferably shows the active source group (S,G) pair above the threshold limit input in the rate field 135. Finally, a Traceback option 136 preferably alters the output by including router state data for the sequence of all routers, starting at the identified router entered in the router field 120 and tracing back to a root of the distribution tree. It should be noted however that in order to use this option both a source and group are preferably specified in the source field 122 and group field 124, respectively.

The output section 150 in FIGS. 4, 5, 6 and 7, shows the compilation of router data collected, within the parameters entered in the input section 110 and in accordance with the information gathered using SNMP, after a router query was initiated (submitted). The router field 151 is displayed at the top of the output. This field 151 is comprised of the IP address of the identified router 151b and the router's name 151a. Either the IP address 151b or name 151a displayed should match data entered in the router field 120. However, regardless of whether an IP address was entered in the router field 120 or not, the initial router field 151 should preferably include both a router name 151a and an IP address 151b. Router names, or at least parts thereof, are easier for human operators to recognize and tend to be more user friendly than IP addresses. Also, routers can have numerous IP addresses (one for each port). Thus, keeping track of a name or part thereof is generally easier than keeping track of numerous addresses. As discussed above with regard to the input Router field 120 the router name is obtained from a table or database of router names or alternatively is obtained through an additional query to the specified router.

Figure 5:
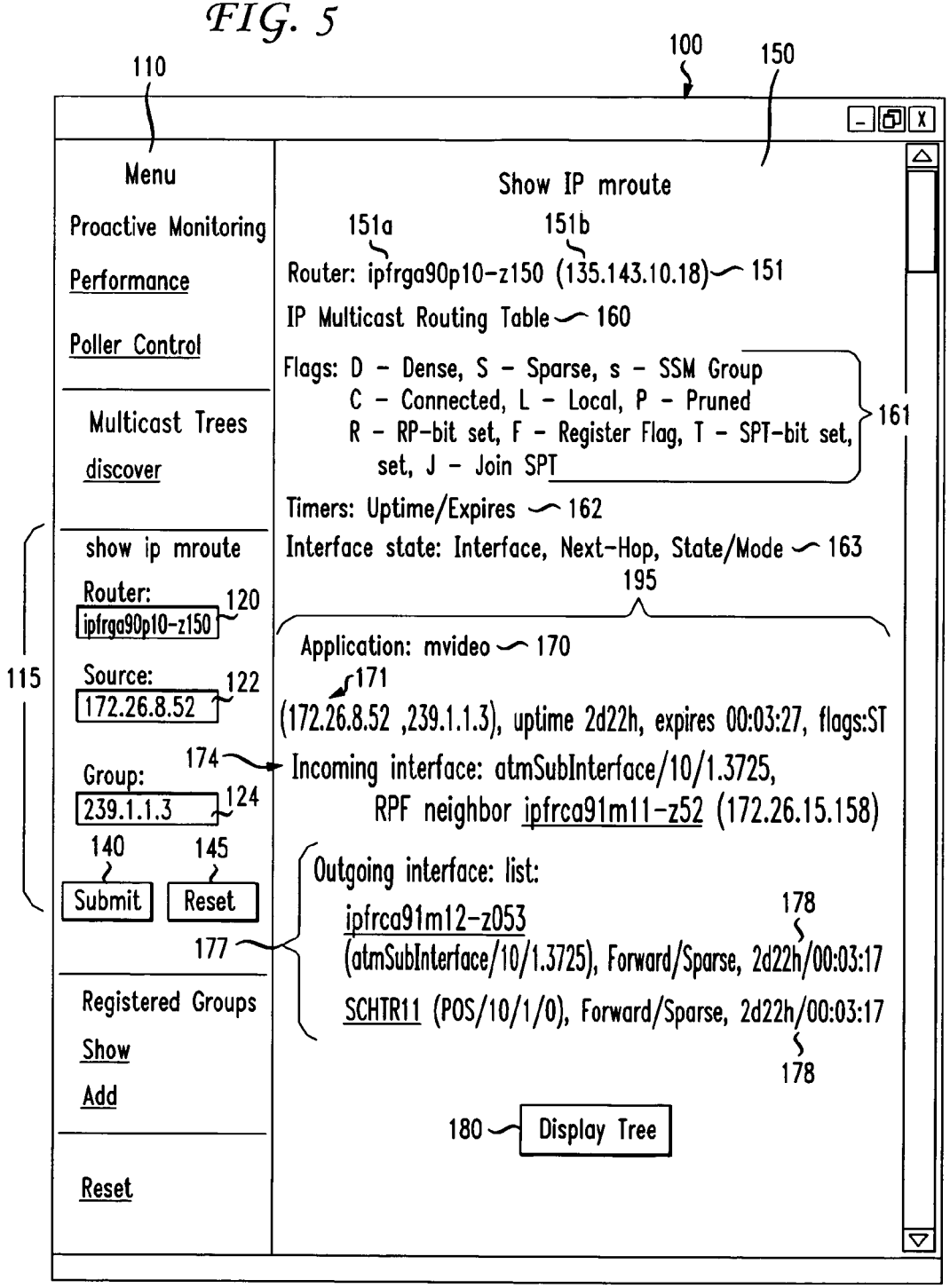
FIG. 5 shows a display at a user interface representing data relating to the router state of a selected router from a specified data source in a specified multicast group in accordance with the present invention

The remainder of the output display that is generated will vary based on the data entered in the input section 110. FIGS. 4 and 5 demonstrate two different output displays. FIG. 4 was generated without specifying a data source in the source field 122. The other was generated specifying a data source in the source field 124. In both FIGS. 4 and 5, immediately below the output display of the router field 151 is the IP Multicast Routing Table area 160. This area emulates select portions of information traditionally contained in the routing table of a router. While almost any portion of the routing table data can be displayed, this embodiment of the invention initially shows a flag index 161, a timers 162 and an interface state 163 for the identified router.

The next areas seen in FIGS. 4 and 5 display data from routing table entries that match the input query criteria 120, 122, 124, from the input section 110. Each of these next areas display data from a single matching routing table entry and are preferably grouped together in the display. In this way, the display representing data from each routing table entry starts at an Application field 170 and ends at a Display Tree button 180. Within each of these next areas are four primary types of information: a) multicast group IP address; b) source IP address (or "*" for all sources); c) incoming interface; and d) the list of outgoing interfaces. However, this router state information is supplemented with names and hyperlinks for any associated routers or other elements reported in each routing table entry.

In FIG. 4, the first matching routing table entry area 190 shown in the output section 150 preferably indicates a shared distribution tree entry (represented by the (*,G) format) 171 identifying an RP router by both IP address 173 and name 172. However, in the case of a multicast session that does not use a RP router, the first entry area 190 would show a source tree entry, as discussed below. In generating the display for these areas 190, 191, 192, 193, each router's name is added adjacent to its IP address with a hypertext link on the displayed name (generally indicated by underlined text of a different color than the primary screen text). An Incoming interface 174 also lists the adjacent upstream router in the shared tree configuration. As with the RP router, this upstream neighbor is listed by both its IP address 175 and its router name 176. The Outgoing interface list 177 is capable of showing any identified downstream routers. The first entry area 190 in FIG. 4 identifies two downstream routers. In addition to identifying downstream routers, the Outgoing interface list is also capable of displaying other functions operating at an indicated interface.

The next matching routing table entry area 191 displayed in FIG. 4, represents the first source tree entry for the specified router and group. If no RP router existed for the identified multicast group, then the first routing table entry area 190 would show the first source tree entry and the subsequent areas 191, 192, 193 would show any additional source tree entries, if applicable. The number of routing table entry areas is dependant on the number of matching routing table entries. The example shown in FIG. 4, represents a multicast group that does use a RP router, thus the first entry is a shared tree entry and the subsequent entries are matching source tree entries. As above in the shared tree entry, each source tree entry contains corresponding information from the routing table.

The Application field 170 shown in FIGS. 4, 5, 6 and 7 displays the equivalent to the name-type field for a multicast group, discussed above with regard to the input group field 124. As in the input context, the name displayed in the application field 170 need not be an actual name, but is just shorthand that may be useful to an operator. The name can be derived from the customer's name, the system or application being run thereon, or any other name an operator might find useful. FIG. 4 shows that mvideo is associated with multicast group 239.1.1.3. As mentioned above, these types of name fields are more user friendly than simply using IP addresses alone. Unlike routers, group names are not specifically registered in a centralized location that can be accessed by all network administrators.

The preferred embodiment of the current invention includes this application field 170. The name displayed is drawn from a lookup table generated and/or maintained by the individual user. The Router State Query application accesses this table and, based on the group IP address, will display the corresponding listed name. If the user does not enter a name for the multicast group application, it should display "Not Registered" or some similar indication, as shown in FIG. 7. However, as mentioned above, it is anticipated that a central registry could be maintained for multicast group names, which could then be accessed to generate the application field display.

The Display Tree screen button 180 shown in FIGS. 4 and 5 is a link to a function that generates a display of a graphical representation of a multicast distribution tree (similar to those seen in FIGS. 2 and 3). Each Display Tree button 180 is associated to the routing table entry it follows. Thus, the distribution tree that is generated from a particular Display Tree button 180 will begin at the source indicated for that routing table entry. In the case of the shared tree entry, the distribution tree begins at the RP router. In the case of any of the source tree entries, each distribution tree would begin at the associated source router. A more detailed disclosure of this concept is provided in a co-pending patent application, application Ser. No. 11/299,543, entitled "Method And System For Identifying Routers In A Multicast Distribution Tree", commonly assigned to AT&T Corp., which is incorporated herein by reference.

FIG. 5 shows an output display generated using similar criteria to that of FIG. 4, except that a data source restriction was entered in the source input field 422. Thus, the output display shown in FIG. 5 is limited to the routing table entry for source 172.26.8.52 and group 239.1.1.3. In contrast, the input that generated FIG. 4 did not restrict the criteria for the source field and thus shows routing table entries for all sources, including the shared distribution tree entry 190. In fact the third routing table entry 192, shown in FIG. 4 has almost all the same data as the single entry 195 shown in FIG. 5. The primary difference between these two entries 192, 195 is the Expires time, shown at the end of each listed Outgoing interface 178. This difference merely highlights that the displays were not generated at the same time. As routing table data is dynamic, the information displayed will be dependent upon the time the application was run.

FIG. 6 demonstrates the use of the Count option in combination with the same criteria specified for FIG. 4 (no source specified). The routing table count data reports the total number of packets continuously received by a router since it joined a session. It also reports the RPF Drops and data transfer rate for that router since it became active in the session. Similarly, FIG. 7 demonstrates the use of the active option. As seen, the active option preferably reports which sources are active for a group and sending data at a rate above a specified threshold. It can also show each source's data transfer rate in the last one second and that sources average data transfer rate during its most recent continuously active period. The rate threshold can be specified by entering a value in the rate (kbps) field 135, also seen in FIG. 7. In the preferred embodiment, a default value of "4" is provided in the rate (kbps) field 135, which preferably can be changed the user.

Figure 8:
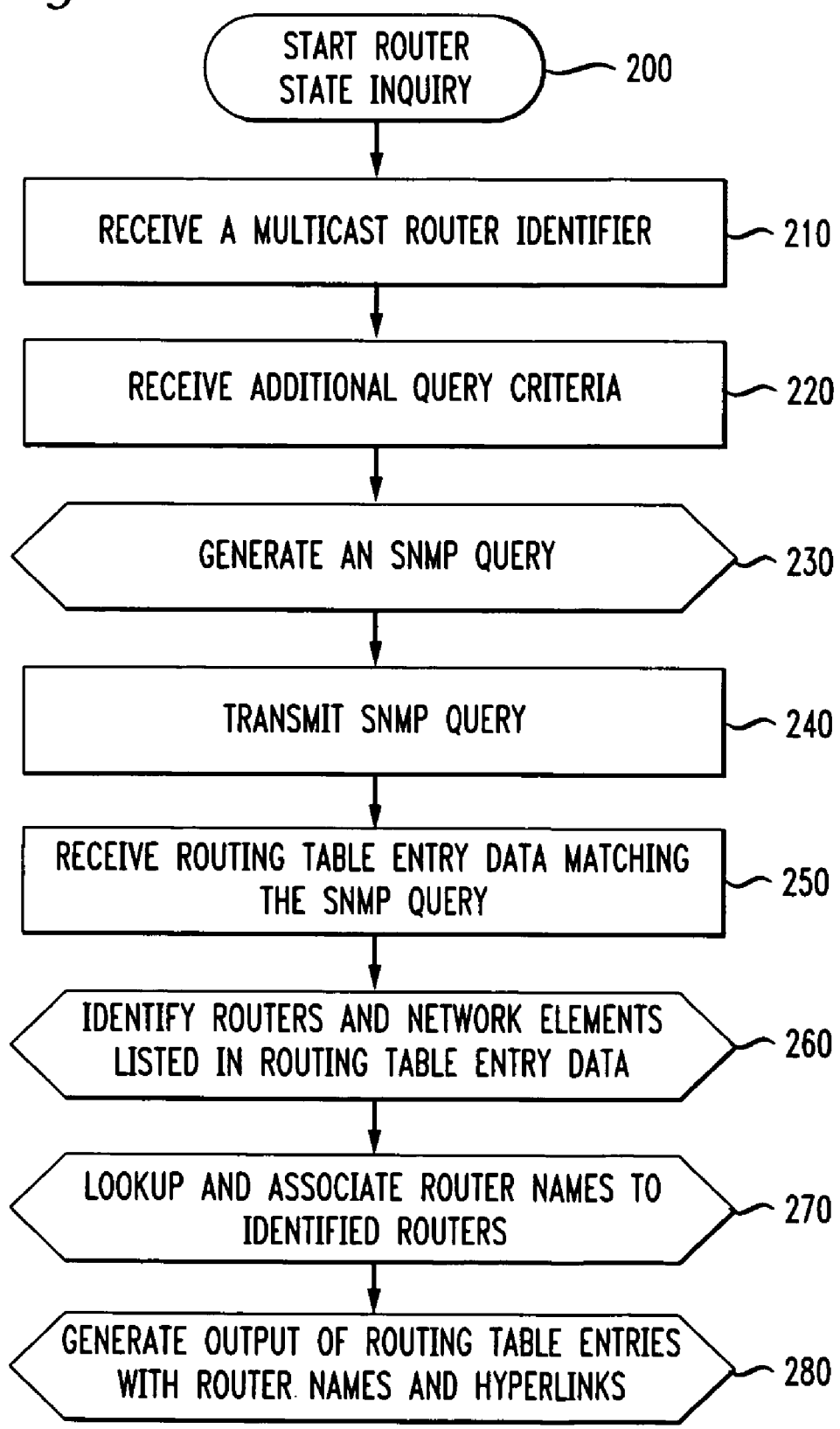
FIG. 8 shows a flow chart of a method of generating a display representing the router state of one or more routers in a multicast network in accordance with the present invention.

The block diagram shown in FIG. 8 outlines the method of the present invention. As the present method and system is designed as a diagnostic tool for multicast networks, the user generally begins with some knowledge about the network. In particular, network administrators and operators preferably start with identifying information for at least one multicast router. This router will be the starting point in the network for monitoring or troubleshooting. Thus, when they start using the Router State Query application in step 200 of this invention, they should be prepared to input at least this piece of information. The user then inputs an identifier for the selected router in step 210 and any additional criteria in step 220 to further narrow or define the type of data they are trying to retrieve. The primary function of the application is to provide router state information. The additional options, such as the Count, Active and Traceback options will alter the type of router state information displayed (as seen in FIGS. 6 and 7). As discussed above, the additional query criteria entered in step 220 can include:

- a multicast group IP address;
- a multicast group IP address and data source IP address;
- an altering query to request traffic flow count verification for the specified router;
- an altering query to request a listing of the active traffic sources sending above a specified rate threshold for the specified group at the specified router; and
- an altering query to request a list of routers from the specified router to its root, which requires at least that a multicast group be specified, and optionally a source can be specified as well (Traceback).

Accordingly, entering any of these additional query criteria will preferably limit and/or alter the query generated by the application. This will preferably customize the multicast routing data collected for the output display that will be compiled. The system preferably generates an SNMP query in step 230 based on the above input data that requests management information base (MIB) objects from the specified router. This query is then transmitted to that specified router in step 240. These queries preferably generate responses from the router according to the specified query. In other words, in response to the queries, a collection of MIB objects will be transmitted back to the location that sent the query.

Below is a list of specific SNMP objects retrieved by the application of the present invention. The output is dependant on the input parameters. There are three main options (seen in FIGS. 6 and 7) that alter the type of output (Count 132, Active 134, Traceback 136), and the results can be further filtered by specifying the data source through (S,G) or (*,G) parameters. The following is a list of the SNMP objects requested by the application of the present invention.

system.sysDescr 1.3.6.1.2.1.1.1 (GET)

system.sysName 1.3.6.1.2.1.1.5 (GET)

ipMRoute.ipMRouteEntryCount 1.3.6.1.2.1.83.1.1.7.0 (GET)

ipMRouteTable.ipMRouteUpstreamNeighbor 1.3.6.1.2.1.83.1.1.2.1.4 (WALK)

ciscoIpMRouteTable.ciscoIpMRouteBps2 .1.3.6.1.4.1.9.10.2.1.1.2.1.31 (WALK)

ipMRouteTable .1.3.6.1.2.1.83.1.1.2.1 (WALK)

ipMRouteTable.ipMRouteUpstreamNeighbor .1.3.6.1.2.1.83.1.1.2.1.4 (WALK)

ipMRouteTable.ipMRouteInIfIndex .1.3.6.1.2.1.83.1.1.2.1.5 (WALK)

ipMRouteTable.ipMRouteUpTime .1.3.6.1.2.1.83.1.1.2.1.6 (WALK)

ipMRouteTable.ipMRouteExpiryTime .1.3.6.1.2.1.83.1.1.2.1.7 (WALK)

ipMRouteTable.ipMRoutePkts .1.3.6.1.2.1.83.1.1.2.1.8 (WALK)

ipMRouteTable.ipMRouteDifferentInIfPackets .1.3.6.1.2.1.83.1.1.2.1.9 (WALK)

ipMRouteTable.ipMRouteOctets .1.3.6.1.2.1.83.1.1.2.1.10 (WALK)

ipMRouteNextHopTable .1.3.6.1.2.1.83.1.1.3.1 (WALK)

ipMRouteNextHopTable.ipMRouteNextHopState .1.3.6.1.2.1.83.1.1.3.1.6 (WALK)

ipMRouteNextHopTable.ipMRouteNextHopUpTime .1.3.6.1.2.1. 83.1.1.3.1.7 (WALK)

ipMRouteNextHopTable.ipMRouteNextHopExpiryTime .1.3.6.1.2.1.83.1.1.3.1.8 (WALK)

ciscoIpMRouteTable .1.3.6.1.4.1.9.10.2.1.1.2.1 (WALK)

ciscoIpMRouteTable.ciscoIpMRoutePruneFlag .1.3.6.1.4.1.9.10.2.1.1.2.1.12 (WALK)

ciscoIpMRouteTable.ciscoIpMRouteSparseFlag.1.3.6.1.4.1.9.10.2.1.1.2.1.13 (WALK)

ciscoIpMRouteTable.ciscoIpMRouteConnectedFlag .1.3.6.1.4.1.9.10.2.1.1.2.1.14 (WALK)

ciscoIpMRouteTable.ciscoIpMRouteLocalFlag .1.3.6.1.4.1.9.10.2.1.1.2.1.15 (WALK)

ciscoIpMRouteTable.ciscoIpMRouteRegisterFlag .1.3.6.1.4.1.9.10.2.1.1.2.1.16 (WALK)

ciscoIpMRouteTable.ciscoIpMRouteRpFlag .1.3.6.1.4.1.9.10.2.1.1.2.1.17 (WALK)

ciscoIpMRouteTable.ciscoIpMRouteSptFlag .1.3.6.1.4.1.9.10.2.1.1.2.1.18 (WALK)

ciscoIpMRouteTable.ciscoIpMRouteJoinFlag .1.3.6.1.4.1.9.10.2.1.1.2.1.25 (WALK)

ciscoIpMRouteTable.ciscoIpMRoutePkts .1.3.6.1.4.1.9.10.2.1.1.2.1.28 (WALK)

ciscoIpMRouteTable.ciscoIpMRouteOctets .1.3.6.1.4.1.9.10.2.1.1.2.1.30 (WALK)

ciscoIpMRouteTable.ciscoIpMRouteBps2 .1.3.6.1.4.1.9.10.2.1.1.2.1.31 (WALK)

pimInterfaceTable.pimInterfaceaddress .1.3.6.1.3.61.1.1.2.1.2 (WALK)

pimInterfaceTable.pimInterfaceMode .1.3.6.1.3.61.1.1.2.1.4 (WALK)

pimNeighborTable.IfIndex .1.3.6.1.3.61.1.1.3.1.2 (WALK)

pimRPTable.pimRPState .1.3.6.1.3.61.1.1.5.1.3 (WALK)

pimRPSetTable .1.3.6.1.3.61.1.1.6.1 (WALK)

Upon receipt of the responding routing table entry data in step 250, the Routing State Query application will examine the data received and identify other routers or network elements listed in the entries in step 260. Next, the Routing State Query application will lookup a unique router name for each identified router or network element IP address in step 270. These names are displayed, in the final output, alongside their corresponding IP addresses. As mentioned above, this lookup function can be performed in a router name database or by generating individual queries to each identified network router or element. Finally, the Routing State Query application generates an output of the compiled routing table entry data in step 280.

In the preferred embodiment, the output is formatted to emulate the "show ip mroute" CLI command. However, the output of the present invention is augmented to include the associated router or network element names adjacent to their displayed IP addresses. Further, the output is augmented to provide hyperlinks on the displayed router names. These hyperlinks allow the user to monitor the router state information of the router associated with that link. In response to selection of the hyperlink, the Routing Table Query application preferably generates another SNMP query in step 230. The new query redefines the multicast router associated with the hyperlink as the new identified multicast router in step 210 and redefines the group associated with the particular routing table entry as the new additional query criteria in step 220. In an alternative embodiment, the new query generated by the hyperlink will further redefine the source associated with the particular routing table entry as further additional query criteria in step 220.

Although preferred embodiments of the present invention have been described herein with reference to the accompanying drawings, it is to be understood that the invention is not limited to those precise embodiments and that various other changes and modifications may be affected herein by one skilled in the art without departing from the scope or spirit of the invention, and that it is intended to claim all such changes and modifications that fall within the scope of the invention.

What is claimed is:

1. A method of obtaining router information in a multicast network, comprising:
   transmitting a routing table query and a router name query;
   receiving router state data associated with a multicast router in response to said routing table query;
   receiving a router identifier associated with said multicast router in response to said router name query, said router identifier including a router name distinct from any IP address associated with said multicast router; and
   displaying said router state data and said router identifier, wherein said display comprises a user interface hypertext link, whereby activation of said hypertext link displays router state data associated with an additional multicast router.

2. A method of obtaining router information in a multicast network as defined by claim 1, wherein at least one of said routing table query and said router name query is adapted to be transmitted in Simple Network Management Protocol (SNMP).

3. A method of obtaining router information in a multicast network as defined by claim 1, wherein said routing table query further comprises at least a multicast group identifier.

4. A method of obtaining router information in a multicast network as defined by claim 1, wherein said routing table query further comprises at least a multicast source identifier.

5. A method of obtaining router information in a multicast network as defined by claim 1, wherein said router state data comprises an identifier for at least one additional multicast router.

6. A method of providing router information in a multicast network, comprising:
   transmitting a selective routing table query comprising at least a source identifier;
   transmitting a router name query;
   receiving router state data associated with a multicast router and said source identifier, in response to said selective routing table query;
   receiving a router identifier associated with said multicast router in response to said router name query; and
   displaying said router state data and said router identifier, wherein said router identifier includes a router name distinct from any IP address associated with said multicast router, wherein said display comprises a user interface hypertext link, whereby activation of said hypertext link displays router state data associated with an additional multicast router.

7. A method of providing router information in a multicast network as defined by claim 6, wherein at least one of said selective routing table query and said router name query is adapted to be transmitted in Simple Network Management Protocol (SNMP).

8. A method of providing router information in a multicast network as defined by claim 6, wherein said selective routing table query comprises at least a group identifier.

9. A system adapted to obtain multicast router information in a multicast network comprising:
   a computer processing device transmitting a routing table query and a router name query, receiving router state data associated with a multicast router in response to said routing table query, receiving a router identifier associated with said multicast router in response to said router name query, said router identifier including a router name being distinct from any IP address associated with said multicast router;
   a graphical user interface operatively coupled to said computer processing device, wherein said graphical user interface displays said router state data and said router identifier, wherein said display comprises a user interface hypertext link, whereby activation of said hypertext link displays router state data associated with an additional multicast router; and
   a communication link for coupling the computer processing device to a multicast network.

10. A system adapted to obtain multicast router information in a multicast network as defined by claim 9, wherein at least one of said routing table query and said router name query is adapted to be transmitted in Simple Network Management Protocol (SNMP).

11. A system adapted to obtain multicast router information in a multicast network as defined by claim 9, wherein said routing table query further comprises at least a multicast group identifier.

12. A system adapted to obtain multicast router information in a multicast network as defined by claim 9, wherein said router state data further comprises an identifier for at least one additional multicast router.

13. A system adapted to obtain multicast router information in a multicast network as defined by claim 9, wherein said router state data further comprises an identifier for at least one data source.

* * * * *